Figure 1:
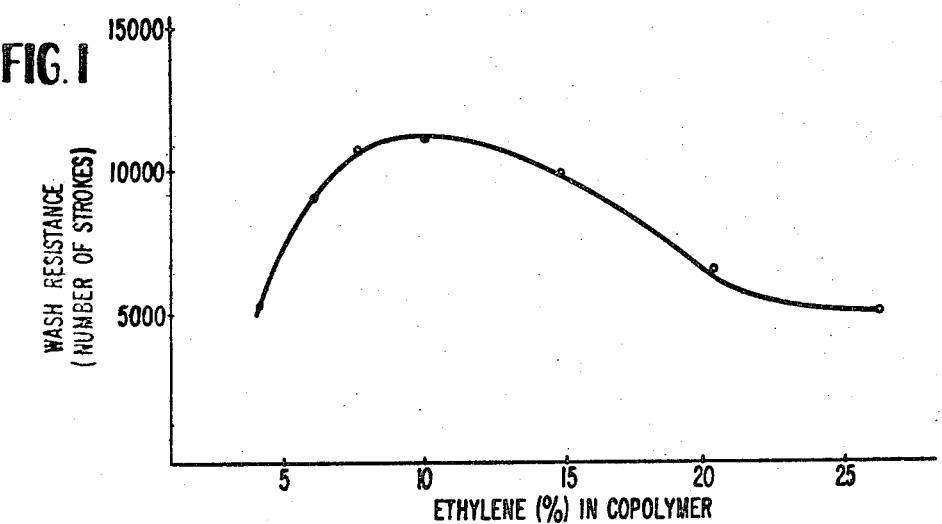

United States Patent [19]
Tsuchihara et al.

[11] 3,816,362
[45] June 11, 1974

[54] PROCESS OF PREPARING STABLE AQUEOUS ETHYLENE VINYL ESTER COPOLYMER EMULSIONS

[75] Inventors: Toyoji Tsuchihara; Youhei Yawaka, both of Kanagawa; Takeshi Noguchi, Osaka, all of Japan

[73] Assignees: Showa Denko Kabushiki Kaisha, Tokyo; Kobunshi Kagaku Kogyo, Osaka, both of, Japan

[22] Filed: May 19, 1971

[21] Appl. No.: 145,011

Related U.S. Application Data

[63] Continuation of Ser. No. 814,959, April 10, 1969, abandoned.

[52] U.S. Cl. 260/17 A, 260/29.6 ME, 260/29.6 MQ, 260/29.6 R, 260/29.6 WA
[51] Int. Cl......... C08f 1/88, C08f 1/13, C08f 37/16
[58] Field of Search 260/29.6 R, 29.6 ME, 29.6 PM, 260/29.6 PT, 87.3, 17 A, 29.6 MQ, 29.6 WA

[56] References Cited
UNITED STATES PATENTS

| | | | |
|---|---|---|---|
| 2,703,794 | 3/1955 | Roedel | 260/29.6 EM X |
| 2,983,696 | 5/1961 | Tocker | 260/87.3 X |
| 3,423,353 | 1/1969 | Levine et al. | 260/29.6 EM |
| 3,423,353 | 1/1969 | Levine et al. | 260/29.6 ME X |
| 3,483,171 | 12/1969 | Kuhlkamp et al. | 260/87.3 X |
| 3,532,658 | 10/1970 | Gintz | 260/87.3 X |
| 3,578,618 | 5/1971 | Beardsley | 260/29.6 R X |

Primary Examiner—Donald J. Arnold
Assistant Examiner—James B. Lowe
Attorney, Agent, or Firm—Sughrue, Rothwell, Mion, Zinn & Macpeak

[57] ABSTRACT

A process for preparing a stable aqueous ethylene-vinyl ester copolymer emulsion having a degree of polymerization of 600 to 4,000 and an ethylene content of 4 to 20 weight percent Emulsion polymerization is conducted at a temperature below 50°C in the presence of 0.02 to 0.2 percent of a redox catalyst until less than one percent of the monomer remains. The copolymer emulsion is then aged at a temperature of 50°C to 100°C for 0.5 to 5 hours.

10 Claims, 3 Drawing Figures

PROCESS OF PREPARING STABLE AQUEOUS ETHYLENE VINYL ESTER COPOLYMER EMULSIONS

CROSS-REFERENCE TO RELATED APPLICATION

The present application is a continuation of Ser. No. 814,959 filed Apr. 10, 1969 and now abandoned.

This invention relates to aqueous emulsions of vinyl ester-ethylene copolymer which are suitably used especially as paints and coatings.

Processes for the preparation of aqueous emulsions of copolymers of vinyl ester and ethylene are known in the literature, e.g., U.S. Pat. No. 2,397,260, U.S. Pat. No. 2,703,794, British Patent No. 582,093, British Patent No. 813,814, British Pat. No. 1,127,085 and Notification of Japanese Patent Application (Publication No.) 8988/1963. Uses of vinyl ester-ethylene copolymers which have been mentioned in such disclosures include, for example, textile finishes, adhesives and coatings. However, acrylic resin-based coatings have hitherto been used for exterior application in place of the conventional vinyl acetate-based aqueous emulsion paints because of poor weather resistant properties, especially poor water and wash resistant properties of the latter.

It is an object of the present invention to provide an aqueous emulsion of vinyl ester-ethylene copolymer which will give a coating film with improved weathering, washing and pigment binding properties.

Another object of the present invention is to provide a process for the preparation of an aqueous emulsion as mentioned above, especially one having good stability.

In accordance with the present invention, there is provided an aqueous emulsion comprising a vinyl ester-ethylene copolymer having an ethylene content of 4 to 20 percent by weight and a degree of polymerization of 600 to 4,000. The aqueous emulsion of the present invention is superior in various properties, especially as regards the wash resistance and alkali resistance of the film coating formed therefrom, to the conventional vinyl acetate-based aqueous emulsions. Further, the coating film formed from the aqueous emulsion of the present invention is comparable in durability to the acrylic resin-based coating film.

Figure 2:
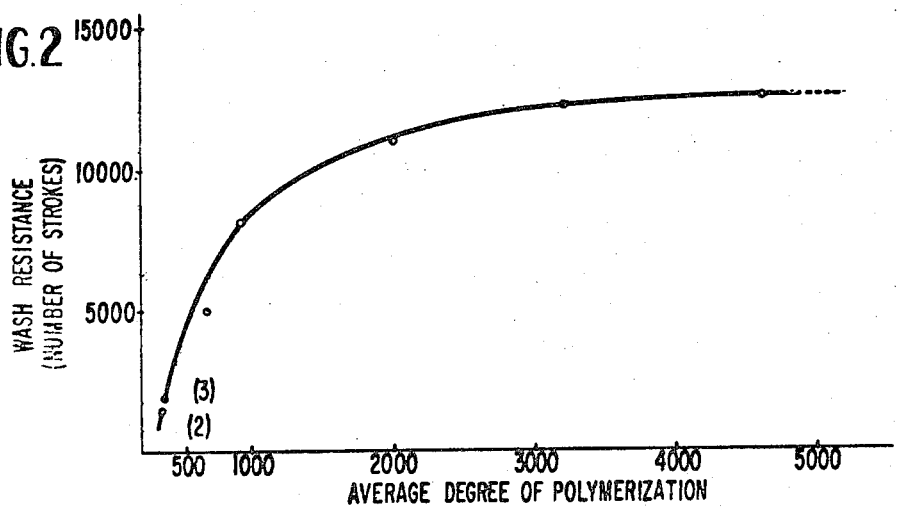
Figure 3:
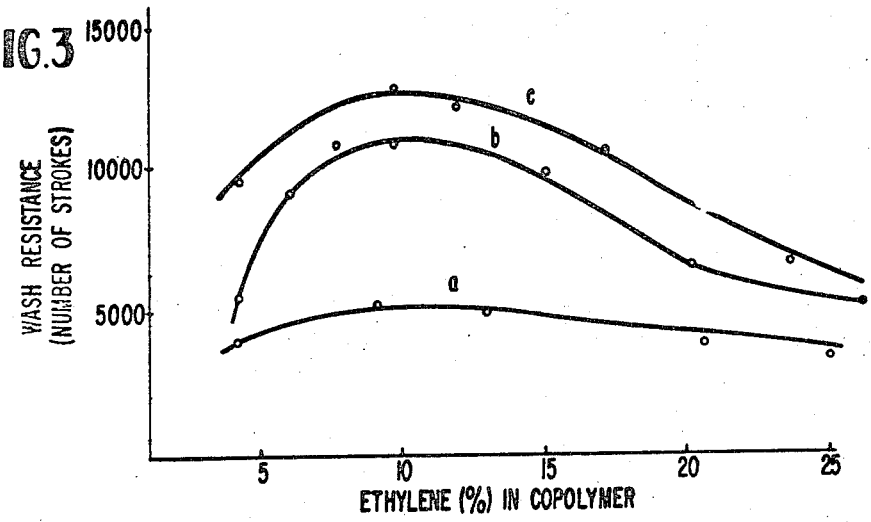

In the accompanying drawings, FIGS. 1 to 3 indicate the wash resistance of a coating film of vinyl ester-ethylene copolymers plotted against ethylene content and degree of polymerization. The wash resistance test was made in the following manner.

An aqueous paint comprising 15 parts (all parts are by weight) of titanium white, 3 parts of talcum powder, 22 parts of calcium carbonate, 14 parts of a 2 percent aqueous solution of a hydroxyethylcellulose, one part of ethyleneglycol, 15 parts of water and 18 parts of a 50 wt. percent aqueous emulsion of ethylene-vinyl acetate copolymer is applied in a thickness of 5 mils on a slate and after air drying for 5 days, subjected to a washing test in 0.5 percent soapy water in a Gardner-type washability tester. The degree of polymerization of the vinyl acetate-ethylene copolymer is calculated by the equation for calculation of degree of polymerization of polyvinyl acetate according to JIS K–6725. The ethylene content of the vinyl acetate-ethylene copolymer is determined by an alkali hydrolysis process. In this hydrolysis process, a 1 gram sample of the polymer is disclosed in 100 ml of a solution of acetone, methanol and water (5:3:2). An aqueous alcoholic 0.5 N sodium hydroxide solution (methanol: water = 9:1) is then added and hydrolysis allowed to occur for two hours at 40° – 45°C. At the end of this time, unreacted sodium hydroxide is titrated with 0.5 N hydrochloric acid and the ethylene content determined.

In FIG. 1, the abscissa indicates the percent by weight of copolymerized ethylene based on the weight of the copolymer (degree of polymerization 800 to 1,000) and the ordinate indicates the wash resistance by number of strokes.

In FIG. 2, the abscissa indicates the average degree of polymerization of copolymers (ethylene content of about 10 percent by weight) and the ordinate indicates the wash resistance by number of strokes. In this figure, points (2) and (3) indicate the degrees of polymerization of the copolymer of Run (2) and the commercially available copolymer, respectively, indicated in the table in Example 6.

In FIG. 3, the abscissa indicates the ehtylene content by weight of copolymer and the ordinate indicates the wash resistance by number of strokes and curve a, b and c corresponding respectively to copolymers having degrees of polymerization of 650, 1,000 and 3,800 respectively.

It will be noticed that vinyl acetate-ethylene copolymers having an ethylene content of 4 to 20 percent by weight (as indicated by FIG. 1) and a degree of polymerization of at least 600 (as indicated by FIG, 2 and 3) have excellent wash resistance. In view of the above and the difficulty as a practical matter, of effectively producing stable aqueous emulsions of vinyl ester-ethylene copolymers having a degree of polymerization of more than 4,000, the degrees of polymerization of the copolymers of this invention will be between 600 and 4,000.

The aqueous emulsion of the vinyl ester-ethylene copolymers of the present invention may be prepared in any conventional manner. In general, the emulsion is obtainable by polymerizing a vinyl ester and ethylene in emulsion in an aqueous medium by the aid of a catalyst or irradiation by, e.g., $Co^{60}$.

As the catalyst there may be used an organic or inorganic peroxide, either alone or in combination with a reducing agent. The organic peroxides are exemplified by lauroyl peroxide, benzoyl peroxide, persuccinic acid, butyl peroxide and cumene hydroperoxide, and the inorganic peroxides may be exemplified by hydrogen perixode, ammonium persulfate, potassium persulfate, perborates and the like. The catalyst preferably is used in the amount of 0.02 to 0.2 percent by weight of the total charge.

The reducing agents which may be used in combination with the peroxide mentioned above to form a redox system include sodium sulfite, sodium bisulfite, ferrous sulfate, tetraethylenepentamine, ascorbic acid and the like, and preferably is used in the amount of 1 to 3 moles per mole of peroxide. The two components may be added all at once to the polymerization system prior to initiation of polymerization or, alternatively, in such a manner that the reducing agent alone is added to the polymerization system and the peroxide is then added in increments during course of the polymerization. The latter procedure is preferably employed.

As indicated by the following table, the use of a catalyst in an amount of more than 0.2 percent by weight, namely more than 0.4 percent by weight of vinyl acetate, causes a deterioration of the properties of the resulting coating.

DEGREE OF POLYMERIZATION VS. WASH RESISTANCE OF COATING FILM

| Amounts of catalyst added (% by weight) | Degree of polymerization | Wash resistance (strokes) |
|---|---|---|
| 0.4 | 331 | 1500 |
| 0.2 | 663 | 5000 |
| 0.1 | 788 | More than 7000 |
| 0.05 | 882 | More than 7000 |

In this experiment, the preparation of the copolymers was carried out in the same manner as in Example 6, below, and the wash resistance test was carried out in the manner described above.

In place of, or in addition to a peroxide catalyst, there may be used as catalyst azobisbutylonitrille, $\alpha,\alpha$-azobisisobutylonitrile, $\alpha,\alpha'$-azobisisobutylic acid esters and the like, the total amount of catalyst employed being 0.02 to 0.2 percent by weight of the whole charge.

As the emulsifier there may be used an anionic surfactant, a nonionic surfactant or a mixture thereof.

Anionic surfactants useful in the process of the present invention may be exemplified by sodium laurylsulfate, sodium nonylphenyl sulfate, sodium nonylphenyl-polyoxyethylene sulfate, sodium octadecylsulfonate and the like. Useful nonionic surfactants may be exemplified by polyoxyethylene-glycol lauryl ether, polyoxyethylene-glycol nonylphenyl ether, polyoxyethylene-glycol monostearate and the like.

If desired, there may be used a protective colloid, such as polyvinyl alcohol, water-soluble cellulose delivatives and polyoxyethylene glycol. The emulsifier and protective colloid may be added all at once to the aqueous phase prior to initiation of emulsion polymerization, or alternatively, may be added during the course of polymerization, either all at once or incrementally.

Although an aqueous emulsion of vinyl ester copolymer which has been prepared in emulsion polymerization in the presence of a protective colloid produces coatings which generally possess somewhat inferior properties, especially in wash resistance, to one which has been prepared without using any protective colloid, in accordance with the present invention there are obtained emulsions which produce coatings possessing excellent properties, in spite of the use of a protective colloid, as shown in FIGS. 1 to 3.

The emulsion polymerization is carried out by introducing a vinyl ester in an amount not exceeding 1.5 times the weight of an aqueous medium into the aqueous medium all at once or in increments under a pressure of ethylene while maintaining a determined temperature to effect copolymerization. The desired polymerization temperature ranges between 10° to 100°C. When radiation is used as catalyst, the temperature employed is preferably 20° to 80°C. When a redox catalyst is used, the temperature may range from 10° to 50°C. When other catalysts, as mentioned above, are used, the temperature may range between 50° to 100°C, preferably between 60° and 80°C.

In the case where removal of reaction heat is insufficient to maintain a desired polymerization temperature, it is preferred to add the vinyl ester in small increments to the reaction mixture. Ethylene is usually introduced under a pressure of 2 to 200 atmospheres and in the amount so as to provide a copolymer having an ethylene content of 4 to 20 percent by weight.

The reaction time usually is 0.5 to 20 hours depending on the various other polymerization conditions, as is well known in the art.

The emulsion thus obtained may be subjected to a variety of uses and additives may be employed according to the contemplated use. Although it is normally desired that the emulsion not contain unreacted monomer (vinyl ester), the presence of such unreacted monomer in the amount of up to 1 percent by weight of the whole emulsion is permissable for some uses. In general, the aqueous emulsion of vinyl ester-ethylene copolymer is put to use as it is, while, of course, the vinyl ester-ethylene copolymer recovered from the reaction system may be re-dispersed in an aqueous medium by the aid of a suitable dispersing agent to form an aqueous emulsion for use.

The aqueous emulsion of the present invention affords a coating film suitable in a variety of applications having excellent weathering, wash resistant, and pigment binding properties and may be used, for example, as coatings and in the finishing of textile fabrics and papers.

Emulsion polymerization in the presence of a redox catalyst is carried out at a lower polymerization temperature than polymerizations employing ordinary free-radical catalysts, and will result in a copolymer of a higher degree of polymerization, which induces the aforesaid excellent properties of the emulsion. However, despite these excellent properties, emulsions obtained by redox catalyst system have relatively poor emulsion stability. For instance, the emulsion may be broken, resulting in coagulation of copolymer. Further, the viscosity of the emulsion may be increased to the unfluid state by various causes, such as various storage conditions, elevated temperatures, vibration or other mechanical load, dilution or mixing of pigment. While the causes of such instability of the emulsion are not known with certainty, it is believed that such instability is attributable to a combination of influences, e.g., interaction between polymer particles, particle size, electric charge, viscosity or residual unreacted monomer.

As a result of various investigations considering these circumstances, we have found that by aging at an elevated temperature subsequent to emulsion polymerization in the presence of a redox catalyst, there is obtained a stable emulsion which has excellent stability in the presence of the various noted above and exhibits an improved coating properties when used as binder or vehicle for pigment for aqueous coatings. This is to say, the improved emulsion of vinyl ester-ethylene copolymer is obtainable by polymerizing in emulsion a vinyl ester and ethylene at a temperature not exceeding 50°C in the presence of a redox catalyst in an aqueous phase, to form a vinyl ester-ethylene copolymer of a combined ethylene content of 4 to 20 percent by weight and of a polymerization degree of 600 to 4,000 and aging the resulting emulsion at a temperature exceeding 50°C but not exceeding 100°C, and that this is a feature of the present invention. The change in ethylene content and in degree of polymerization during the aging is negligible. The aging is performed by maintaining the aqueous emulsion at a temperature exceeding 50°C but not exceeding 100 °C while stirring. Temperatures below 50°C will not sufficiently bring about the effect, while temperatures exceeding 100 °C will cause a breakdown of the emulsion. The optimum aging temperature ranges between 60° and 90°C. The presence of ethylene during the aging has no substantial effect on the resulting emulsion, so that the aging is conveniently carried out in the presence of ethylene under a pressure of from the polymerization pressure to atmospheric pressure. The aging time usually is 0.5 to 5 hours. Aging for less than 0.5 hour will not bring about sufficient results, and the aging for more than 5 hours does not result in any additional advantage. The most effective and economical aging conditions for individual emulsions may be selected from within the above ranges.

Aqueous emulsions of vinyl ester-ethylene copolymers prepared in accordance with the present invention, as set forth above, possess various properties, being much more stable than those prepared by conventional redox polymerization and are of very great value as surface finishes for textile fabrics and paper and as pigmented aqueous coatings.

The present invention will now be illustrated in more detail by the following examples, in which all parts and percentages are by weight.

EXAMPLE 1

Into a 1 liter pressure vessel there was charged a mixture of 274 parts of vinyl acetate, 50 parts of a 12 percent aqueous solution of polyvinyl alcohol of an average molecular weight of 2,000, 8.4 parts of polyoxyethylene nonylphenyl ether having 30 – 35 ethylene oxide units in the molecule as a nonionic surfactant, 2.2 parts of sodium dodecylbenzenesulfonate as anionic surfactant, 1.5 parts of potassium persulfate, 1.5 parts of sodium bisulfite and 271 parts of water. Ethylene is then introduced until the pressure reached 20 atmospheres. The emulsion polymerization was conducted at 30 °C with stirring for about 4 hours to obtain an aqueous emulsion having a solids content of 47.8 percent. The copolymer in the emulsion thus formed possessed a degree of polymerization of 2,230 and of an ethylene contant of 6.2 percent.

19 parts of the aqueous emulsion so formed was mixed with 15 parts of titanium white, 35 parts of a filler (15 parts of clay and 20 parts of precipitated calcium carbonate), 14 parts of a 2 percent aqueous solution of hydroxyethylcellulose, 1 part of ethylene glycol and 14 parts of water to prepare a white coating. The coating was applied to a slate and to a sheet glass and, after drying for 5 days, subjected to a wash resistance test. The wash resistance as measured in accordance with JIS K–5663 was 8,500 strokes. The consistency of the coating was 80 KU. The water resistance of the coating film was 4 in case of slate and 3 in case of sheet glass, and the alkali resistance was 4 both in case of slate and of sheet glass.

The cosistency of coating was measured by a Stomer Viscometer, the optimum KU-value (Krebs Units) ranging between 65 and 80.

The wash resistance test was made in accordance with JIS K–5663. Namely, the coating was applied in a thickness of 5 mils to a slate and, after drying in air for 5 days, subjected to a washing test in a 5 percent aqueous soap solution by means of a Gardner-type washability tester. Wash resistance in this test is determined by the number of strokes (of the reciprocating brush of the tester) required before the coating film begins to come off the surface.

Water resistance and alkali resistance is determined in the following manner. The coating was applied to a slate and a sheet glass and the coated slate and sheet glass were, after drying in air for 5 days, soaked in water and a 1 percent aqueous caustic soda for 24 hours. The degree of damage of the coating film by water or 1 percent aqueous caustic soda was indicated as water resistance or alkali resistance, respectively. The hardness (the harder, the better) and extent of blister (the less the blister, the better) were estimated by cross-hatching the coating film after the soaking by means of a pin or razor blade.

The coatings are rated as follows:
5: Perfect (no blister, coating film is hard)
4: Good (no blister, coating film is soft)
3: (A few blisters, coating film is soft — The lowest standard for useful articles)
2: (Coating film partially removed — Wanting practicality)
1: Bad (e.g., the coating film completely peeled away)

COMPARATIVE EXAMPLE 1a

The same polymerization mixture as in Example 1, except that sodium bisulfite was eliminated, was polymerized under the same conditions as in Example 1 except that the polymerization temperature was 70 °C to obtain an aqueous emulsion containing 49.0 percent solids and possessing a degree of polymerization of 400. The ethylene content of the polymer was 6.2 percent. The emulsion was prepared into a coating composition similar to that in Example 1, and the properties of the coating film obtained therefrom were evaluated. The consistency of the coating composition was 83 KU, the water resistance was 3.5 in case of slate and 2 in case of sheet glass, the alkali resistance was 2 in case of slate and 2.5 in case of sheet glass, and the washing resistance was merely 800 strokes.

EXAMPLE 2

A mixture of 277 parts of vinyl acetate, 46.6 parts of a 6.0 percent aqueous solution of hydroxyethylcellulose, 6.3 parts of polyoxyethylene nonylphenyl ether having 30 – 35 ethylene oxide units in the molecule, 10.8 parts of sodium dodecylbenzenesulfonate, 0.6 part of ammonium persulfate and 255 parts of water was charged into a closed pressure vessel and the mixture was maintained at 74°C for 5 hours while introducing thereinto ethylene under a pressure of 30 atmospheres, to obtain an aqueous emulsion, having a solids content of 52.6 percent, of a copolymer of an average degree of polymerization of 948 and a combined ethylene content of 10.0 percent. The emulsion was prepared into a coating composition in the same manner as in Example 1 and formed into a coating film of which the properties were evaluated. The consistency of the coating composition was 70 KU, the alkali resistance was 4.5 in case of slate and 3.5 in case of sheet glass, the alkali resistance was 3.5 in case of slate and 3.5 in case of glass sheet, and the washing resistance was 8,000 strokes.

EXAMPLE 3

An emulsion polymerization was conducted at 35°C for 6 hours using a mixture of 300 parts of vinyl acetate, 12 parts of a polyoxyethylene glycol monostearate having 30 to 35 ethylene oxides units in the molecule, 12 parts of sodium laurate, 1.3 parts of sodium hydrogen sulfite and 310 parts of water under an ethylene pressure of 30 atmospheres to obtain an aqueous emulsion, having a solids content of 49.3 percent, of a copolymer possessing a degree of polymerization of 3,200 and a combined ethylene content of 6.3 percent. A coating was prepared from the aqueous emulsion in the same manner as in Example 1 and evaluated. The consistency of the coating was 83 KU, the water resistance was 5.0 in case of slate and 2.5 in case of sheet glass, the alkali resistance was 5.0 in case of slate and 3.0 in case of sheet glass, and the washing resistance was 12,000 strokes.

EXAMPLE 4

The aqueous emulsions prepared in Examples 2 and 3 were formulated into coatings in accordance with the following recipe and evaluated.

Recipe: Titanium white, 20 parts; filler (clay, 10 parts and calcium carbonate, 14 parts), 24 parts; 2 percent aqueous solution of hydroxyethylcellulose, 10 parts; and 50 percent aqueous emulsion, 31.7 parts.

|  | Base material | Aqueous emulsion of Ex. 2 | Aqueous emulsion of Ex. 3 |
| --- | --- | --- | --- |
| Consistency (KU) of coating |  | 67 | 78 |
| Water Resistance | Slate | 4.5 | 5 |
|  | Glass | 4 | 4.5 |
| Alkali resistance | Slate | 4 | 5 |
|  | Glass | 3.5 | 4 |
| Washing resistance (strokes) |  | 5,600 | 16,000 |

EXAMPLE 5

A mixture of 300 parts of vinyl acetate, 12 parts of a poly (oxyethylene) glycol monostearate having 30 – 35 ethylene oxide units in the molecule, 12 parts of sodium lauryl sulfate and 310 parts of water was irradiated at 25°C by γ-rays of $5 \times 10^5$ rads from 400 curies of $Co^{60}$, while introducing thereinto ethylene under a pressure of 20 atmospheres, to obtain an aqueous emulsion, having a solids content of 50.3 percent, of a copolymer possessing an average degree of polymerization of 5,200 and an ethylene content of 5.8 percent. From the aqueous emulsion was prepared a coating in the same manner as in Example 1, and the coating was evaluated to obtain the data as follows; Consistency of coating 78 KU, Water resistance 5 (slate) and 4 (sheet glass), Alkali resistance 5.0 (slate) and 3.5 (sheet glass), Washing resistance 12,500 strokes.

EXAMPLE 6

Run (1): 300 parts of vinyl acetate was polymerized in emulsion in admixture with 12 parts of polyoxyethylene nonylphenyl ether having 30 – 35 ethylene oxide units in the molecule, 3 parts of sodium dodecylbenzenesulfonate, 310 parts of water and 0.6 part of ammonium persulfate at 75°C for 4 hours, while introducing thereinto ethylene under a pressure of 20 atmospheres, to obtain an emulsion, having a solids content of 50.8 percent, of a copolymer possessing an average degree of polymerization of 788 and an ethylene content of 10.2 percent. The emulsion was formulated into a coating in the same manner as in Example 1, and the properties of the resulting coating film were determined.

Run (2): An emulsion was prepared in the same manner as in Run (1) except that there was used 2.4 parts of ammonium persulfate. The emulsion thus obtained contained 49.8 percent of a copolymer having an average degree of polymerization of 331 and an ethylene content of 10.3 percent. For comparison with Run (1), in the following table were summarized the properties of the coating films prepared from the emulsion of this run, and of a commercially available vinyl acetate-ethylene copolymer emulsion, a polyvinyl acetate emulsion and a polyvinyl acetate emulsion and a polyacrylate emulsion, all conventionally employed for coatings.

| Emulsion | Run (1) | Run (2) | Commercially available copolymer | Polyvinyl acetate | Polyacrylate |
| --- | --- | --- | --- | --- | --- |
| Water resistance: |  |  |  |  |  |
| Slate | 5.0 | 2 | 1.5 | 3.5 | 5.0 |
| Glass | 4.5 | 1.5 | 1 | 3.5 | 4.5 |
| Alkali resistance: |  |  |  |  |  |
| Slate | 5.0 | 1.5 | 2 | 2 | 4.5 |
| Glass | 4.5 | 1.5 | 1.5 | 1.5 | 4.5 |
| Washing resistance (strokes) | >7,000 | 1,500 | 1,700 | 400 | >7,000 |
| Polymerization degree | 788 | 331 | 345 |  |  |
| Combined ethylene content (percent) | 10.2 | 10.3 | 9.5 |  |  |
| Weathering initial elongation (percent) | 670 | 680 | 600 | 540 | 900 |
| Test elongation after aging (percent) | 355 | 305 | 280 | 0 | 550 |

The weathering test was made under the following conditions; Test piece; Vehicle film (thickness 0.2 to 0.5 mm)
Weather meter: Standard Sunshine Weather Meter, Toyo Rika Kogyo K.K.
Light source: Sunshine Carbon Arc. (Filter: 310 – 510mμ)
Irradiation time: 300 hours (Shower: 18 mins/hr.)
Temperature: 50° – 60°C
Humidity: 60 percent
Shape of test piece: Long strip, which was stretched in longitudinal direction.

The above table illustrates that the properties of the emulsion of vinyl acetate-ethylene copolymer of the present invention are comparable with that of a commercially available acrylate emulsion and that the emulsion prepared in Run (2) resembles the commercially available vinyl acetate-ethylene copolymer emulsion in properties.

EXAMPLE 7

300 parts of vinyl propionate was polymerized in emulsion at 74°C for 6 hours in admixture with 50 parts of a 6 percent aqueous solution of hydroxyethylcellulose, 8 parts of polyoxyethylene nonylphenyl ether having 30 – 35 ethylene oxide units in the molecule, 2 parts of sodium dodecylbenzenesulfonate, 0.6 part of ammonium persulfate and 268 parts of water at 74°C for 6 hours, while introducing thereinto ethylene under a pressure of 25 atmospheres; to obtain an emulsion, having a solids content of 51.8 percent, of a copolymer of a polymerization degree of 1,120 and an ethylene content of 8.7 percent. The emulsion was formulated into a coating composition in the same manner as in Example 1 and the properties of the coating were determined. The consistency of the coating composition was 75 KU, the water resistance was 5.0 (slate) and 4.0 (sheet glass), the alkali resistance was 4.5 (slate) and 4.0 (sheet glass), and the washing resistance was 8,200 strokes.

EXAMPLE 8

Run A: A mixture of 300 parts of vinyl acetate, 12 parts of polyoxyethylene nonylphenyl ether having 30 – 35 ethylene oxide units in the molecule, 3 parts of sodium dodecylbenzenesulfonate, 1.3 parts of ammonium persulfate and 1.5 parts of sodium hydrogen sulfite as catalyst, and 310 parts of water was charged into an 1 liter autoclave. Emulsion polymerization was conducted at 40°C for 3 hours with stirring under an ethylene pressure of 20 atmospheres. Then the polymerization mixture was aged by heating to 70°C over 1 hour and maintaining at the temperature for additional 1 hour to obtain a stable emulsion, having a solids content of 51.3 percent and an unreacted monomer content of 0.40 percent, of a copolymer possessing a degree of polymerization of 4,000 and an ethylene content of 5.1 percent. For examination of the properties of the emulsion as coating, a white coating composition was prepared by mixing 19 parts of the emulsion with 15 parts titanium white, 35 parts of filler consisting of 15 parts of clay and 20 parts of precipitated calcium carbonate, 14 parts of a 2 percent aqueous solution of hydroxyethylcellulose, 1 part of ethylene glycol and 14 parts of water. The washing resistance of the coating film formed on sheet glass from the coating composition was 12,000 strokes. The consistency of the coating composition was 72 KU, the water resistance was 5.0 (slate) and 3.5 (sheet glass), the alkali resistance was 5.0 (slate) and 3.5 (sheet glass).

Run B: The same polymerization mixture as in Run A was polymerized for 3 hours under the same conditions as in Run A, and then stirred at 40°C for 2 hours. Thus, there was obtained an aqueous emulsion, having a solids content of 49.3 percent and an unreacted monomer content of 1.10 percent, of a copolymer possessing a degree of polymerization of 3,200 and an ethylene content of 5.8 percent. From the aqueous emulsion was prepared a coating composition as in the preparation of the coating composition of Run A, and the properties of the coating film formed therefrom were examined. The washing resistance was 12,000 strokes, the consistency of the coating was 83 KU, the water resistance was 5.0 on slate and 2.5 on sheet glass, and the alkali resistance was 5.0 on slate and 3.5 on sheet glass.

Examinations of various stabilities were made on the emulsions and compounded coatings of Runs A and B in accordance with JIS K-6828. A rating of O represents passing the test (no effect on stability of emulsion). A rating of X indicates failure (emulsion unstable under conditions of test).

|  | Run A | Run B |
| --- | --- | --- |
| Low temperature stability of emulsion | 0 | 0 |
| High temperature stability of emulsion | 0 | x |
| Storage stability of emulsion | >6 months | <1 month |
| Dilution stability of emulsion | 0 | x |
| Mechanical stability of emulsion | 0 | x |
| Low temperature stability of coating | 0 | 0 |
| High temperature stability of coating | 0 | x |

The conditions of the above tests are as follows:
1. Low temperature stability test: Maintained at −5°C for 16 hours and then at 20°C for 8 hours, the cooling and heating cycle was repeated three times.
2. High temperature stability test: Heated at 50°C for 200 hours.
3. Dilution stability test: Emulsion was diluted with water to solids content of 3 percent and allowed to stand for 72 hours.
4. Mechanical stability test: Emulsion was stirred for 10 minutes in a homo-mixer at 10,000 rpm.

EXAMPLE 9

A mixture of 900 parts of vinyl acetate, 36 parts of polyoxyethylene nonylphenyl ether having 30 – 35 ethylene oxide units in the molecule, 9 parts of sodium dodecylbenzenesulfonate, 3.8 parts of ammonium persulfate, 4.5 parts of sodium hydrogen sulfite and 930 parts of water was subjected to emulsion polymerization in a 3 liter autoclave at 30°C for 4 hours under an ethylene pressure of 20 atmospheres and then aged at 75°C for 2 hours. Thus, there was obtained an aqueous emulsion, having a solids content of 48.1 percent and an unreacted monomer content of 0.44 percent, of a copolymer possessing a degree of polymerization of 3,040 and an ethylene content of 5.9 percent. This emulsion passed each of the stability tests of Example 8.

EXAMPLE 10

The polymerization mixture of Example 9 was subjected to emulsion polymerization in a 3 liter autoclave at 40°C for 3 hours under an ethylene pressure of 50 atmospheres and then aged at 60°C for 2 hours to obtain an aqueous emulsion, having a solids content of 50.2 percent and an unreacted monomer content of 0.53 percent, of a copolymer possessing a degree of polymerization of 3,930 and an ethylene content of 14.3 percent. This emulsion passed each of the stability tests of Example 8.

EXAMPLE 11

A mixture of 300 parts of vinyl acetate, 10 parts of a poly (oxyethylene) glycol monostearate having 30 – 35 ethylene oxide units in the molecule, 2 parts of sodium lauryl sulfate, 1.3 parts of ammonium persulfate, 1.5 parts of sodium hydrogen sulfite, 275 parts of water and 37.5 parts of an 8 percent aqueous solution of polyvinyl alcohol as protective colloid was subjected to emulsion, polymerization in an 1 liter autoclave at 40°C for 3 hours under an ethylene pressure of 30 atmospheres and then aged at 65°C for 3 hours to obtain a stable aqueous emulsion, having a solids content of 49.7 percent and an unreacted monomer content of 0.46 percent, of a copolymer possessing a degree of polymerization of 2,810 and an ethylene content of 9.4 percent. From this emulsion was prepared a coating composition in the same manner as in Example 8. The coating composition stood passed each of the stability tests of Example 8. The consistency of the coating was 77 KU, and the washing resistance of the resulting coating film as 11,000 strokes, the water resistance was 4.5 on slate and 4.0 on sheet glass, and the alkali resistance was 4.5 on slate and 3.5 on sheet glass.

We claim:
1. A batch process for preparing a stable aqueous ethylene-vinyl ester copolymer emulsion having a wash resistance of at least 5,000 strokes and excellent water and alkali resistance and having a solids content of from 47.8 to 52.6 percent, said vinyl ester being vinyl acetate or vinyl propionate and said copolymer having an ethylene content of from 4 to 20 percent by weight and a degree of polymerization of from 600 to 4,000, said process consisting of:

1. preparing an initial aqueous emulsion by adding, to an aqueous medium consisting essentially of, in addition to ethylene, an emulsifier, a protective colloid and water; said vinyl ester in an amount not exceeding 1.5 times by weight based on the weight of said aqueous medium;
2. emulsion polymerizing said vinyl ester and ethylene at a temperature not exceeding 50°C. in the presence of from 0.02 to 0.2 percent by weight, based on the weight of said initial aqueous emulsion, of a redox catalyst for a period of time sufficient to form an intermediate aqueous ethylene-vinyl ester copolymer emulsion containing less than 1 percent by weight, based on the weight of said intermediate aqueous copolymer emulsion, of unreacted monomer; and
3. aging the intermediate aqueous emulsion at a temperature of from 50° to 100°C. for a period of time of from 0.5 to 5 hours to provide said stable aqueous ethylene-vinyl ester copolymer emulsion.

2. The process of claim 1, in which the ageing is conducted at a temperature of from 60°C to 90°C with stirring.

3. The process of claim 1 wherein said emulsifier is selected from the group consisting of an anionic surfactant, a nonionic surfactant and mixtures thereof.

4. The process of claim 3 wherein said anionic surfactant is selected from the group consisting of sodium laurylsulfate, sodium nonylphenyl sulfate, sodium nonylphenyl-polyoxyethylene sulfate and sodium octadecylsulfonate.

5. The process of claim 3 wherein said nonionic surfactant is selected from the group consisting of polyoxyethylene-glycol lauryl ether, polyoxyethylene-glycol nonylphenyl ether and polyoxyethylene-glycol monostearate.

6. The process of claim 3 wherein said redox catalyst consists essentially of an inorganic or organic peroxide in combination with a reducing agent.

7. The process of claim 4 wherein said organic peroxide is lauroyl peroxide, benzoyl peroxide, persuccinic acid, butyl peroxide and cumene hydroperoxide and wherein said inorganic peroxide is hydrogen peroxide, ammonium persulfate, potassium persulfate or perborates.

8. The process of claim 4 wherein said reducing agent is selected from the group consisting of sodium sulfite, sodium bisulfite, ferrous sulfate, tetraethylenepentamine and ascorbic acid and wherein the reducing agent is present in an amount of from 1 to 3 moles per mole of said inorganic or organic peroxide.

9. The process of claim 1 wherein said protective colloid is polyvinyl alcohol, water-soluble cellulose derivatives or polyoxyethylene glycol.

10. The process of claim 4 wherein the polymerization temperature varies from 10° to 50°C.

* * * * *

UNITED STATES PATENT OFFICE
CERTIFICATE OF CORRECTION

Patent No. 3,816,362        Dated June 11, 1974

Inventor(s) Toyji Tsuchihara, et al

It is certified that error appears in the above-identified patent and that said Letters Patent are hereby corrected as shown below:

In The Heading:

The Claimed Priority Data was omitted. Should read:

--April 10, 1968     Japan . . . . . . . . . . . . . 23398. 1968--

Signed and sealed this 1st day of October 1974.

(SEAL)
Attest:

McCOY M. GIBSON JR.            C. MARSHALL DANN
Attesting Officer               Commissioner of Patents